United States Patent
Yueh (10) Patent No.: US 8,135,918 B1
(45) Date of Patent: Mar. 13, 2012

(54) DATA DE-DUPLICATION FOR ISCSI

(75) Inventor: Jedidiah Yueh, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 628 days.

(21) Appl. No.: 11/968,052

(22) Filed: Dec. 31, 2007

(51) Int. Cl.
 *G06F 12/00* (2006.01)
 *G06F 13/00* (2006.01)
 *G06F 13/28* (2006.01)

(52) U.S. Cl. ................ 711/147; 711/159; 711/162

(58) Field of Classification Search .............. 711/147, 711/159, 162
See application file for complete search history.

(56) References Cited

U.S. PATENT DOCUMENTS

| | | | |
|---|---|---|---|
| 2002/0169934 A1* | 11/2002 | Krapp et al. | 711/159 |
| 2007/0226444 A1* | 9/2007 | Yagawa | 711/170 |
| 2008/0005141 A1* | 1/2008 | Zheng et al. | 707/101 |
| 2008/0005201 A1* | 1/2008 | Ting et al. | 707/204 |
| 2008/0294696 A1* | 11/2008 | Frandzel | 707/200 |
| 2009/0019246 A1* | 1/2009 | Murase | 711/162 |

* cited by examiner

*Primary Examiner* — Jared Rutz
*Assistant Examiner* — Ryan Bertram
(74) *Attorney, Agent, or Firm* — Workman Nydegger (57) ABSTRACT

Redundant data is identified and eliminated in a network that implements the iSCSI protocol either in-band at the source, in-band at the target, or out-of-band at the target. For in-band de-duplication, a data block included with a write command is assigned a unique identifier that is compared to a database of unique identifiers corresponding to previously written data. If the unique identifier is identical to an existing unique identifier, this indicates that the data block is redundant and has previously been stored elsewhere, in which case it is not stored again. Instead, the storage address specified in the write command may be added to a routing table showing the equivalence of unique identifiers, actual storage addresses, and duplicate storage addresses. When a read request specifying a duplicate storage address is received, the duplicate storage address can be translated to a corresponding unique identifier which points to the actual storage address.

20 Claims, 7 Drawing Sheets

DATA DE-DUPLICATION FOR ISCSI

CROSS-REFERENCE TO RELATED APPLICATIONS

Not Applicable.

BACKGROUND OF THE INVENTION

1. The Field of the Invention

The present invention relates to data storage solutions. More particularly, embodiments of the invention relate to software, hardware, systems and methods for de-duplicating data in SCSI storage devices accessed using the iSCSI protocol.

2. The Relevant Technology

Economic, political, and social power are increasingly managed by data. Transactions and wealth are represented by data. Political power is analyzed and modified based on data. Human interactions and relationships are defined by data exchanges. Hence, the efficient distribution, storage, and management of data is expected to play an increasingly vital role in human society.

The quantity of data that must be managed, in the form of computer programs, databases, files, and the like, increases exponentially. As computer processing power increases, operating system and application software becomes larger. Moreover, the desire to access larger data sets such as multimedia files and large databases further increases the quantity of data that is managed. This increasingly large data load must be transported between computing devices and stored in an accessible fashion. The exponential growth rate of data is expected to outpace the improvements in communication bandwidth and storage capacity, making data management using conventional methods even more urgent.

One set of standards for physically connecting and transferring data between computers and peripheral devices for storage is the small computer systems interface, also referred to as "SCSI." SCSI is implemented as a local bus allowing a computer to access, for instance, a locally attached hard disk using any one of four different categories of SCSI commands including non-data, write, read, and bidirectional commands. A SCSI read typically includes three steps: (1) an initiator (e.g., the computer) sends a read command to a target (e.g., the hard disk) specifying a starting block address and the number of contiguous blocks to transfer, (2) the target sends the requested data to the initiator, and (3) the target sends a status indicator to the initiator indicative of the success or failure of the read. As another example, a SCSI write typically includes four steps: (1) the initiator sends a SCSI write command to the target specifying a starting block address and the number of contiguous blocks that will be transferred by the command, (2) the target sends an indication to the initiator that it is ready to receive the data, (3) the initiator sends the data to the target, and (4) the target sends a status indicator to the initiator. Internet SCSI, also referred to as "iSCSI" is a protocol that allows initiators to send SCSI commands to remote SCSI storage devices over IP networks without the special-purpose cabling required for conventional SCSI. Basically, iSCSI is the embedding of SCSI commands over the TCP/IP protocol, allowing iSCSI to be run over long distances using existing network infrastructure. It enables organizations to consolidate storage into data center storage arrays while providing hosts with the illusion of locally-attached disks.

As the data load managed in networks implementing the iSCSI protocol increases over time, the amount of redundant data stored within a single SCSI storage device or across multiple SCSI storage devices also increases, which reduces the amount of available storage by the amount occupied by the redundant data. Consequently, what are needed are methods and systems for identifying and eliminating redundant data in networks implementing the iSCSI protocol.

The subject matter claimed herein is not limited to embodiments that solve any disadvantages or that operate only in environments such as those described above. Rather, this background is only provided to illustrate one exemplary technology area where some embodiments described herein may be practiced

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to methods and systems for de-duplicating data in networks that implement the internet small computer systems interface ("iSCSI") protocol. In a typical embodiment, write commands are analyzed to determine whether write data is identical to data already stored in the network. This may include deriving a probabilistically unique identifier (such as a hash value) from the write data based on its content, and comparing the probabilistically unique identifier to a database of probabilistically unique identifiers derived from previously written data. If the probabilistically unique identifier is identical to any of the existing probabilistically unique identifiers, this indicates that a duplicate of the write data has previously been stored somewhere in the system. In this case, rather than redundantly storing the write data, a re-routing record may be stored to re-route future read requests for the write data to the duplicate of the write data.

In particular, read commands are analyzed in order to identify requests for what would otherwise be duplicate instances of data. This may include using a storage address specified in a read command to identify a probabilistically unique identifier derived from data previously "written" to the storage address. In this case, "written" refers to the case where the data is actually written to the storage address and where only a re-routing record pointing to a duplicate of the data at a different storage address is stored. The probabilistically unique identifier can then be used to identify an actual storage address of the requested data.

In the embodiment just described, the re-routing record may include two portions. First, the re-routing record may include an entry in a hash lookup table or index showing the equivalence of storage addresses to hash values. There may be one or more storage addresses corresponding to a single hash value. For instance, where multiple write commands have been received for the same data block, each command specifying a different storage address, the hash lookup table would show the equivalence of each of the different storage addresses to a single hash value derived from the data block. Alternately, where a single previous write command for a given data block is received, the hash lookup table would show the equivalence of a single storage address to the hash value derived from the data block.

Second, the re-routing record may include an entry in an address lookup table or index showing the equivalence of hash values to actual storage addresses. In this case, there may be a one to one relationship between hash values and actual storage addresses. Thus, each hash value points to an actual storage address where the data block the hash value was derived from is stored. Alternately, a hash value address translation function may be used to identify storage addresses for data blocks in which case the second portion of the re-routing record would be replaced by the address translation function.

To practice the invention, the computer systems and storage devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use iSCSI and other I/O, data transfer, and storage protocols, but the invention is not intended to be limited to the example embodiments or to specific hardware and storage mechanisms as it is useful for nearly any data storage arrangement.

I. Example Computer Networks

Figure 1A:
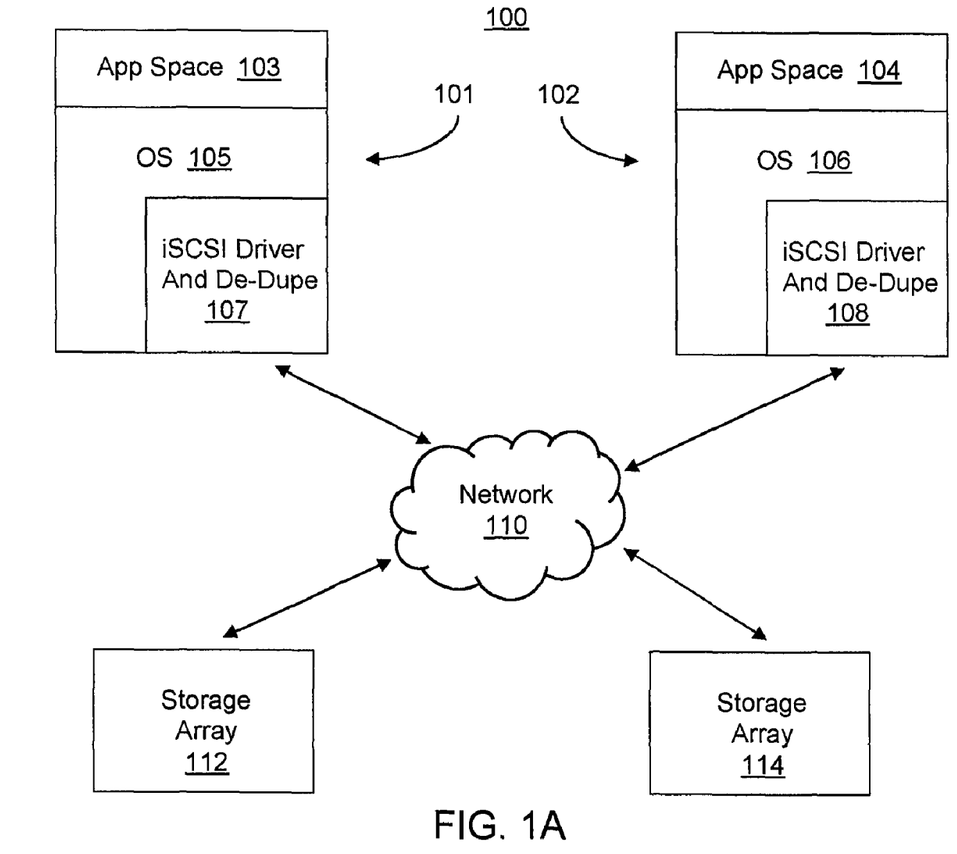
FIG. 1A illustrates an example computer network that implements in-band at the source data de-duplication for iSCSI.
Figure 1B:
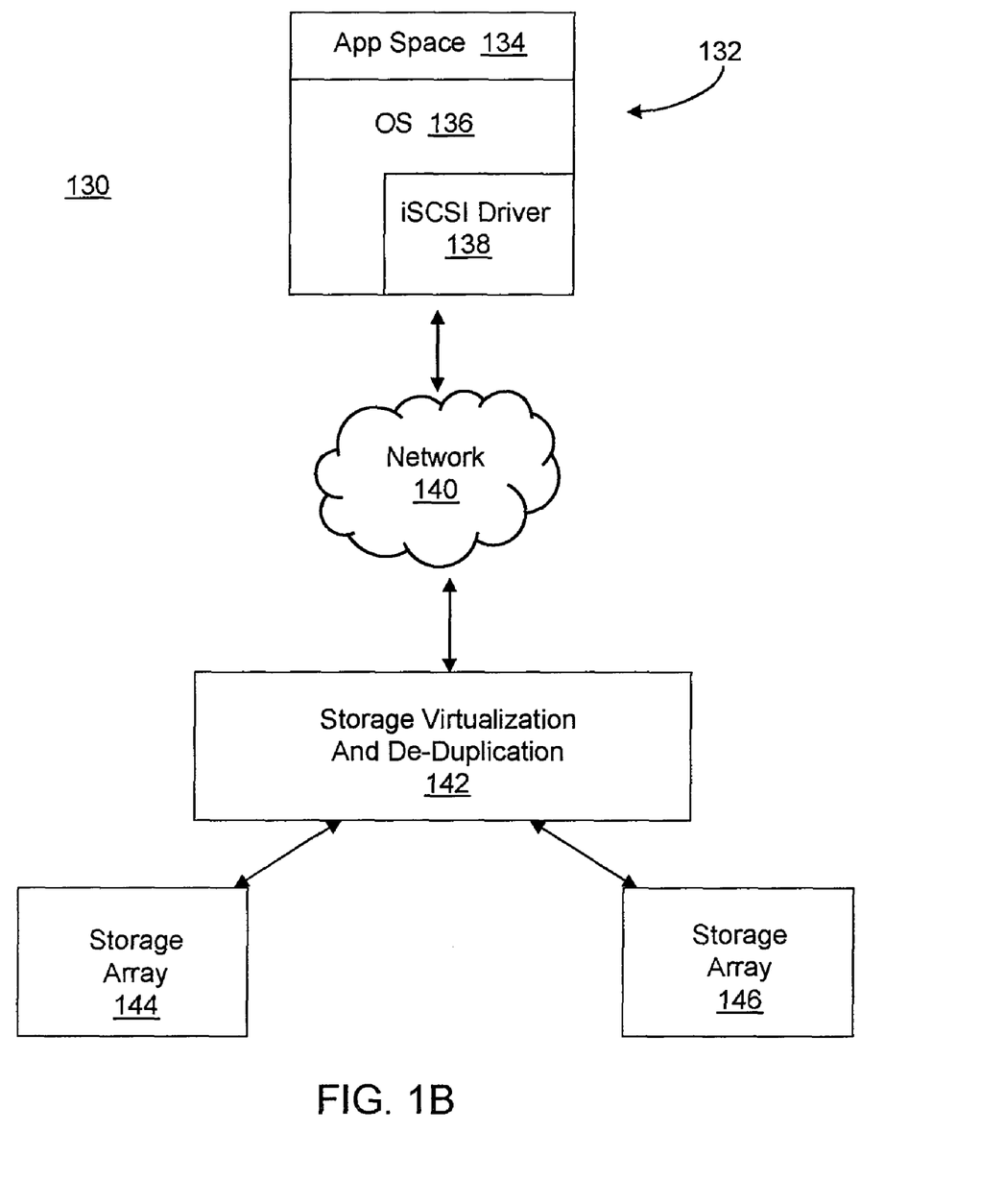
FIG. 1B illustrates an example computer network that implements in-band at the target data de-duplication for iSCSI.
Figure 1C:
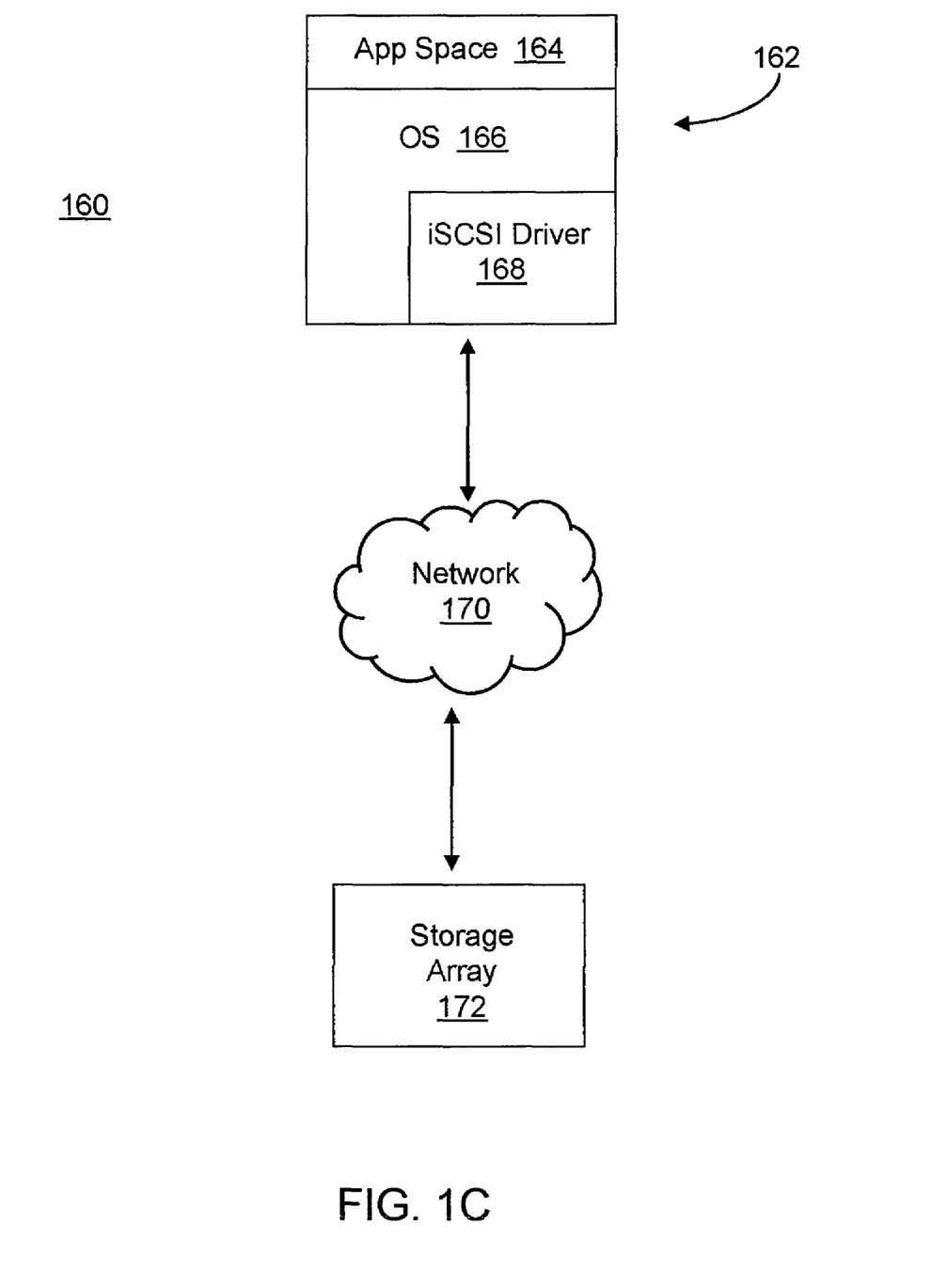
FIG. 1C illustrates an example computer network that implements out-of-band at the target data de-duplication for iSCSI.

With reference now to FIGS. 1A-1C, various example computer networks are illustrated in which embodiments of the invention can be implemented. Each of the computer networks illustrated in FIGS. 1A-1C is shown in simplified or example form and is intended to represent a distributed network of computer systems/devices that generate digital data that is stored on one or more small computer system interface ("SCSI") storage devices. Redundant data stored within and/or across the SCSI storage devices—also referred to as "targets"—can be reduced and/or eliminated in any one of the following three ways: (1) in-band at the source (FIG. 1A), (2) in-band at the target (FIG. 1B), or (3) out-of-band post processing at the target (FIG. 1C). Further, various configurations can be implemented, including multiple sources to multiple targets (FIG. 1A), single source to multiple targets (FIG. 1B), or single source to single target (FIG. 1C). One skilled in the art will appreciate, with the benefit of the present disclosure, that any one of the three methods for de-duplicating data can be implemented in any one of the three configurations.

In FIG. 1A, the computer network 100 includes a plurality of host systems 101, 102 that each run one or more server applications 103, 104, such as a file server, email server, and the like or any combination thereof. The host systems 101, 102 may also be referred to as "sources" 101, 102. An operating system ("OS") 105, 106 is installed and run on the host systems 101, 102 to manage the sharing of the resources of each host system amongst the one or more server applications 103, 104 running on the host system. The host systems 101, 102 each include an iSCSI driver 107, 108 which essentially serves the same purpose as a SCSI bus adapter would, except that instead of physically cabling SCSI devices, the iSCSI driver sends SCSI commands over IP networks. In this manner, SCSI commands can be implemented via the iSCSI protocol over existing network infrastructure without requiring the use of special-purpose cabling.

In particular, each of the iSCSI drivers 107, 108 can send SCSI commands over an IP communications network 110. The communications network 110 implements the TCP/IP protocol and may comprise one or more of a LAN, a WAN, the Internet, or other wired and/or wireless digital communications networks that implement the TCP/IP protocol.

SCSI commands, such as read and/or write commands, can be sent over the communications network 110 to storage devices 112, 114. Each of the storage devices 112, 114 may comprise, for instance, a single storage device or a storage array (as shown) including solid state storage, hard disks, tape drives, and the like or any combination thereof. In this embodiment, each storage array 112, 114 may present one or more iSCSI targets to the iSCSI drivers 107, 108, which may also be referred to as "initiators" 107, 108.

In the embodiment shown in FIG. 1A, iSCSI block requests are de-duplicated in-band at the source (e.g., at the host system 101 or 102) by the iSCSI driver 107, 108. As will be explained more fully below, this basically includes identifying duplicate writes and rather than sending them to the storage array 112, 114 for storage, storing a record on the host system 101, 102 for re-routing future block requests for the duplicate data to a single instance of the data at a different storage address on the storage arrays 112, 114, or in any other location such as local memory. In this embodiment, each of the host systems may communicate with each other to identify duplicate writes written by the other host systems. According to this embodiment, network traffic over the communications network 110 is advantageously reduced since duplicate data blocks are not sent across the communications network 110 for storage.

Turning to FIG. 1B, a second computer network 130 is illustrated in which embodiments of the invention can be implemented. FIG. 1B depicts a slightly different configuration in which a single source or host system 132 issues SCSI commands to multiple targets or storage arrays 144. The host system 132 is similar to the host systems 101, 102 of FIG. 1A with an operating system 136 running one or more server applications 134 and including an iSCSI driver 138 for implementing the iSCSI protocol over IP communications network 140. In this embodiment, however, data de-duplication is implemented in-band at the target rather than in-band at the source via a storage abstraction or virtualization layer 142.

The storage virtualization layer 142 is provided in the computer network 130 to manage access to or "virtualize" some or all of the storage capacity from each of the SCSI storage arrays 144, 146 into a uniform pool and separate the hardware of this pool from the host system 132. For instance, the virtualization layer 142 may present a virtualized representation of at least a portion of the storage arrays 144, 146 to the host system 132. One skilled in the art will appreciate that the virtualized representation can be mapped by the virtualization layer to physical storage on all or a portion of a single storage array 144 or 146 or to physical storage on all or portions of multiple storage arrays 144 and 146.

The method for de-duplicating redundant iSCSI block requests in the embodiment of FIG. 1B is similar to the embodiment of FIG. 1A, except that it occurs in the storage virtualization layer 142 rather than in the iSCSI driver 138. In particular, the storage virtualization layer 142 identifies duplicate writes before they are written to storage and maintains a record for re-routing future block requests for the duplicate data to a single instance of the data at a different storage address on any of the storage arrays 144, 146, or in any other location.

Turning to FIG. 1C, a third example computer network 160 is illustrated in which embodiments of the invention can be implemented. FIG. 1C depicts a third configuration in which a single source or host system 162 issues SCSI commands to a single target or storage array 172. The host system 162 is similar to the host systems 101, 102, 132 of FIGS. 1A and 1B with an operating system 166 running one or more server applications 164 and including an iSCSI driver 168 for implementing the iSCSI protocol over IP communications network 170. In this embodiment, however, data de-duplication is implemented out-of-band at the target rather than in-band as in FIGS. 1A and 1B.

In particular, SCSI block requests for write commands are received by the storage array 172 from the iSCSI driver 168 and the data is stored at the requested storage addresses. Post-processing, however, a de-duplication module 174 on the storage array 172 analyzes stored data to identify and eliminate redundant blocks from storage. A re-routing record is stored that permits future block requests for read commands to blocks that have been purged to be re-routed to a single instance of the data at a different storage address.

II. Example De-Duplication Methods for iSCSI

Figure 2:
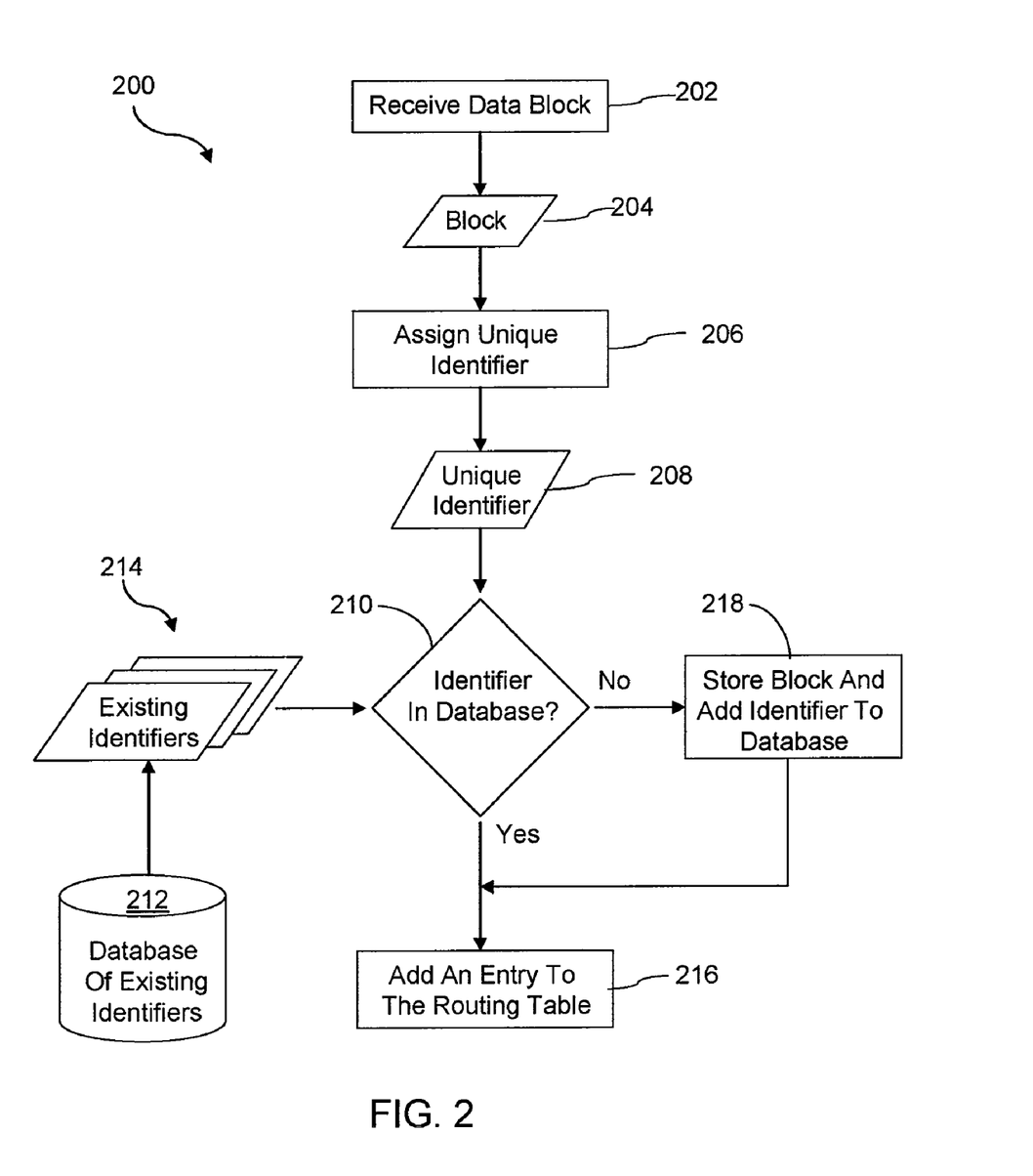
FIG. 2 is a logic flow chart depicting a process for de-duplicating iSCSI write commands in-band.

With additional reference to FIG. 2, a logic flow chart is shown depicting a process 200 for identifying and eliminating duplicate data in iSCSI write commands in-band by an iSCSI driver or a storage virtualization layer as illustrated in FIG. 1A or 1B, respectively. The method 200 begins by receiving 202 one or more data blocks for storage in a SCSI storage device (such as the storage arrays 112, 114, 144, 146 of FIGS. 1A-1B). The one or more data blocks may be received, for instance, by the iSCSI driver 107, 108 from an application 103, 104 of the host system 101, 102 for in-band-at-the-source de-duplication, or by the storage virtualization layer 142 from the iSCSI driver 138 for in-band-at-the-target de-duplication.

Additionally, prior to or concurrently with receiving the one or more data blocks, a starting storage address is received. For in-band-at-the-source de-duplication, the OS 105, 106 may specify the starting storage address to the iSCSI driver 107, 108 for inclusion in an iSCSI write command formatted by the iSCSI driver 107, 108.

For in-band-at-the-target de-duplication, the storage-virtualization layer 142 receives an iSCSI write command specifying the starting storage address from the iSCSI driver 138. In this case, the received data blocks may be solicited data (e.g., the data blocks are not received until the target sends, in response to the write command, an indication to the initiator that the target is ready to receive the data blocks), unsolicited data (e.g., the data blocks are received after the target receives the write command but before sending an indicator to the initiator), or immediate data (e.g., the data blocks are received with the write command).

For each data block 204, the method 200 continues by the iSCSI driver 107, 108 or the virtualization layer 142 assigning 206 a unique identifier 208 to the data block 204 derived from the contents of the data block. The unique identifier 208 may be, for instance, a hash value obtained by performing a hash function on the data block. The assignment of unique identifiers to data blocks may be deterministic insofar as the same data block is always assigned the same unique identifier. Additionally, the unique identifiers may be probabilistically unique (e.g., the chance of assigning the same unique identifier to two or more different data blocks is negligible), truly unique, or any combination thereof.

The resulting unique identifier 208 of the block 204 is compared 210 to the contents of a database 212 containing unique identifiers corresponding to data blocks previously stored in the computer network 100 or 130. In the embodiment of FIG. 1A, each of the sources 101, 102 may locally maintain all or a portion of the database 212 in the form of one or more caches, indices, or libraries of unique identifiers. If the unique identifier 208 is not included in the local database of a first source 101 or 102, the first source may ask a second source 102 or 101 to compare the unique identifier to its local database.

In the embodiment of FIG. 1B, the local database 212 may be maintained in memory or storage associated with the storage virtualization layer 142. Alternately or additionally, the local database 212 may be maintained in all or a portion of one of the storage arrays 144 or 146. For instance, in one embodiment of the invention, one or both of the storage arrays 144, 146 may include solid state storage, which typically has much faster read and write speeds than a traditional hard disk. In this case, the local database 212 could be maintained in solid state storage for quick access to facilitate in-band de-duplication at the target.

In any event, the contents of the database 212 including unique identifiers is provided in the form of existing unique identifiers 214 for the comparison operation of decision step 210.

If the unique identifier 208 of the data block 204 is already in the database 212, this indicates that the data block has already been stored at an address different than the one specified for the data block. Rather than redundantly storing the data block 204 at the specified address, the iSCSI driver 107, 108 or storage virtualization layer 142 adds 216 an entry to a routing table establishing a relationship between the specified storage address and the unique identifier of the corresponding data block. The established relationship simply indicates that the data block that would have been written to the specified storage address is equivalent to the unique identifier. The unique identifier, in turn, points to the actual address of a single instance of the data block. Thereafter, a future read request specifying the specified address can be translated into the unique identifier 208 that re-directs the read request to the actual address of the data block.

On the other hand, if the unique identifier 208 for the data block is not currently in the database, the data block 204 is stored 218 in the computer network 100, 130 and the unique identifier 208 is added to the database 212 of unique identifiers. In one embodiment, the data block is stored at the specified storage address. In this case, the routing table may record that the data block with the particular unique identifier is stored at the specified storage address and can then additionally record 216 duplicate storage addresses for future duplicate write commands.

Alternately, when the unique identifier 208 is not currently in the database, the data block can be stored at a storage address determined by performing an address translation function on the unique identifier. In this case, one portion of the unique identifier 208 can be used to indicate one node from among a plurality of nodes within the storage arrays 112, 114 or 144, 146, another portion of the unique identifier 208 may be used to indicate which stripe of data at that particular node, and yet another portion of the unique identifier to indicate where within that stripe the data resides. Additional details regarding a hash value address translation function are disclosed in U.S. Pat. No. 6,704,730 (the '730 patent) and U.S. Pat. No. 6,810,398 (the '398 patent), both of which are incorporated herein by reference in their entirety.

In addition to storing 218 the data block (either at the specified storage address or at an address derived from an address translation function) and adding the unique identifier to the database of identifiers, the iSCSI driver or storage virtualization layer adds 216 an entry to the routing table establishing a relationship between the specified storage address and the unique identifier such that future read commands to the specified storage address can be used to lookup the corresponding unique identifier and thereby determine the actual storage address, which may be the same as the specified storage address in one embodiment.

Figure 3:
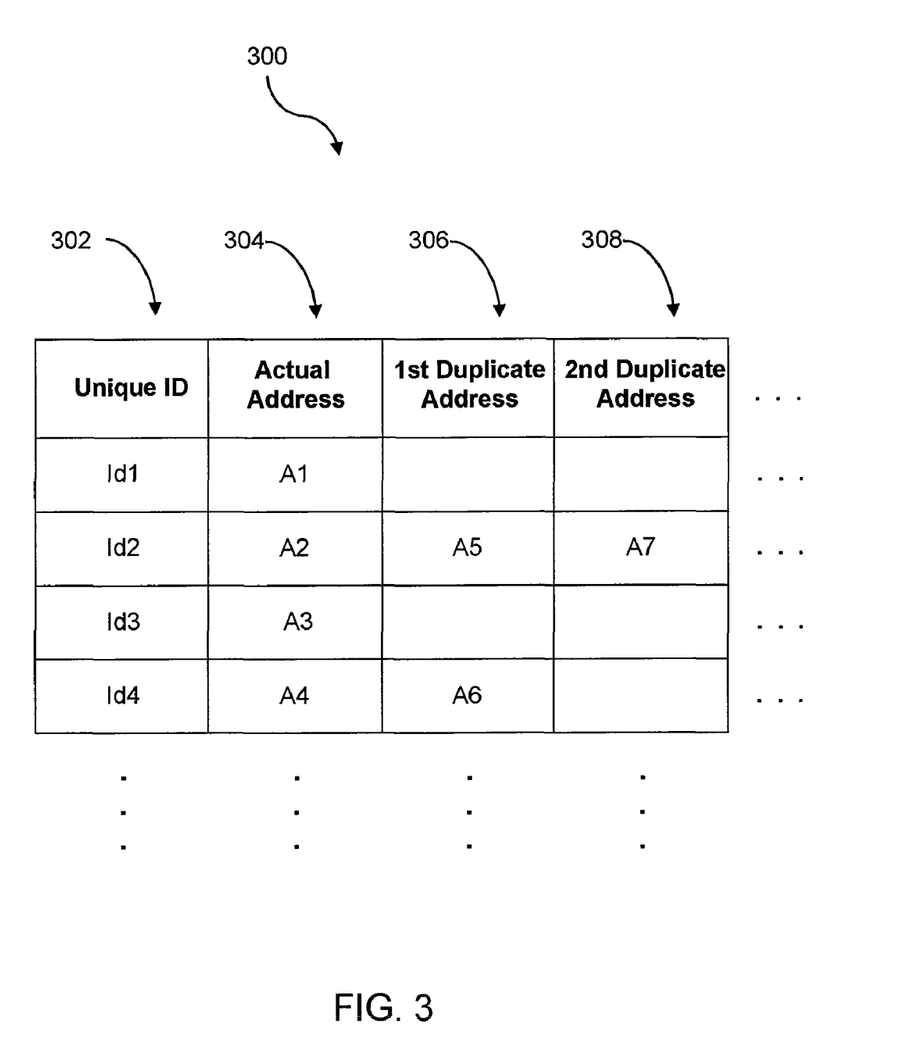
FIG. 3 depicts one embodiment of a routing table that can be implemented to de-duplicate iSCSI write and read commands.

One embodiment of a routing table 300 is illustrated in FIG. 3. As shown, the routing table 300 comprises a plurality of information fields, including a unique identifier field 302 and one or more storage address fields 304, 306, 308. In this particular embodiment, new data blocks are stored at specified storage addresses and the corresponding unique identifiers and specified storage addresses are stored in information fields 302 and 304. When the iSCSI driver or storage virtualization layer receives a duplicate write command, the unique identifier for the data block can be located in the routing table 300 and the duplicate storage address can be added to the routing table.

For instance, the data block corresponding to unique identifier Id4 is stored at storage address A4 (which may have been specified in a write command when the data block was first stored). In addition, a duplicate write command to store the data block at address A6 was identified and the address A6 was added to the routing table to establish a relationship between address A6 and unique identifier Id4 which indicates that the data block that would have been stored at address A6 is equivalent to the unique identifier Id4, and the unique identifier Id4 points to a single instance of the data block at address A4.

Alternately, in the embodiment where new data blocks are written to storage addresses derived from a unique identifier address translation function, the routing table can be modified accordingly. In this case, for instance, it is not necessary to include actual storage addresses in information field 304 for the data corresponding to the unique identifiers in information field 302. Instead, each unique identifier includes all the information necessary to determine a corresponding actual storage address.

Alternately or additionally, the routing table 300 can be broken into two or more tables. For instance, one table can be used to record the relationship between unique identifiers and specified storage addresses. This might be, for example, a hash lookup table that can be used to lookup hash values of data blocks previously "written" to specific storage addresses. A second table could be used to record specific storage addresses for data blocks corresponding to unique identifiers. For example, an address lookup table could be used to lookup actual storage addresses of data blocks using their corresponding unique identifiers. It should be apparent to one skilled in the art, with the benefit of the present disclosure, that the specific implementations of a routing table described herein are illustrative only and should not be construed to limit the invention.

Figure 4:
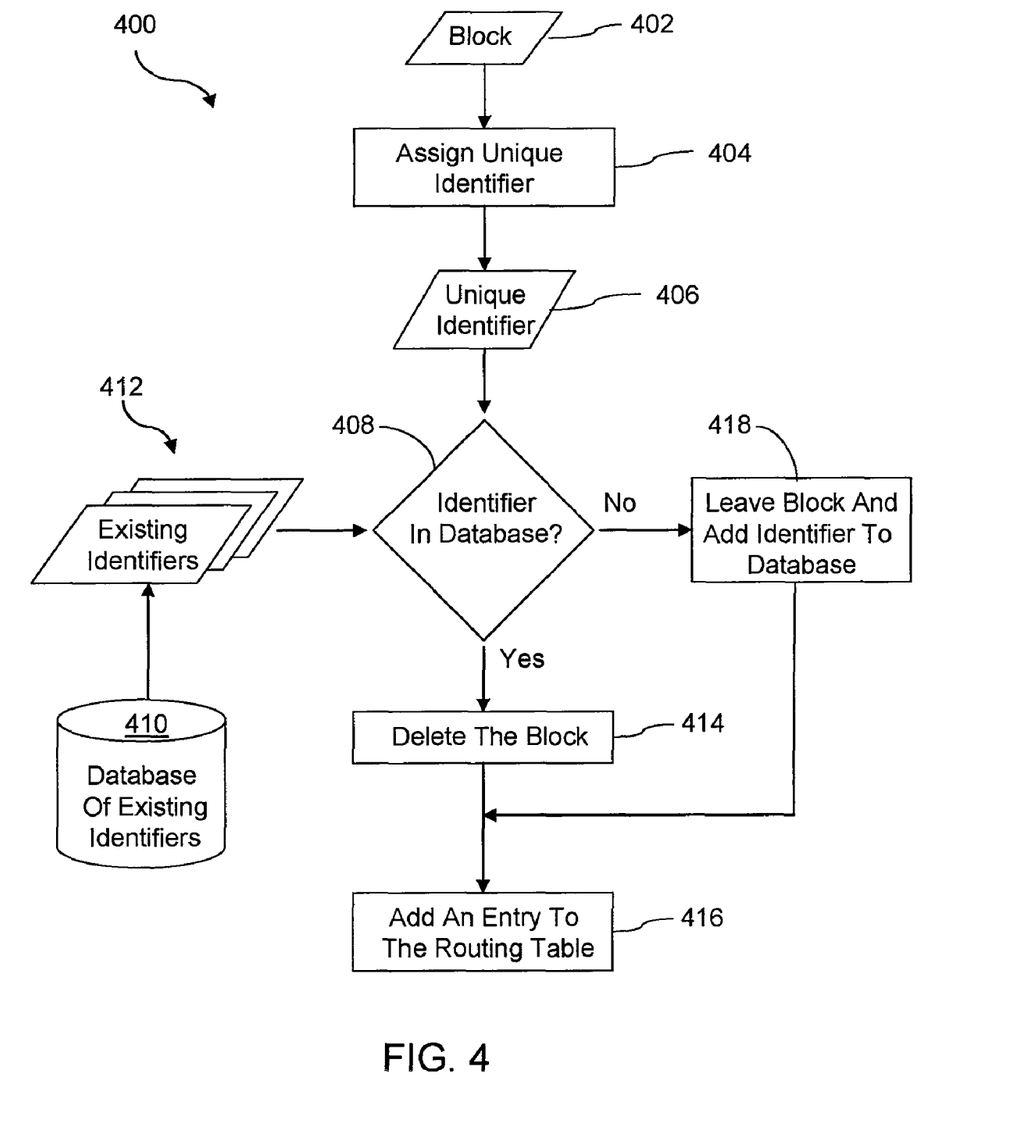
FIG. 4 is a logic flow chart depicting a process for de-duplicating iSCSI write commands out-of-band.

With additional reference to FIG. 4, a logic flow chart is shown depicting a process 400 for identifying and eliminating duplicate data out-of-band at the target according to the embodiment of FIG. 1C. The method 400 begins after an iSCSI write command has been received and the corresponding data has been written to the storage array 172 of FIG. 1C at a first storage address. In this case, the de-duplication module 174 crawls the storage array 172 to identify and eliminate duplicate data. In particular, for each data block 402, the de-duplication module 174 assigns 404 to the data block a unique identifier 406. The unique identifier 406 may be both deterministic and probabilistically (or actually) unique, as described above.

The unique identifier 406 of the block 402 is compared 408 to the contents of a database 410 containing unique identifiers corresponding to data blocks stored in the storage array 172. In the embodiment of FIG. 1C, the de-duplication module 174 may locally maintain on the storage array 172 the database 410 of existing unique identifiers in the form of one or more caches, indices, or libraries. In one embodiment in which out-of-band de-duplication at the target is implemented with multiple targets, each target may maintain all or a portion of the database 410 of existing unique identifiers and if the unique identifier 406 is not included in the local database of a first target, the first target may ask a second target to compare the unique identifier to its local database. In any event, the contents of the database 410 including unique identifiers is provided in the form of existing unique identifiers 412 for the comparison operation of decision step 408.

If the unique identifier 406 of the data block 402 is already in the database 410, this indicates that the data block has previously been stored at a second storage address in the storage array 172. Rather than redundantly storing the data block 402 at the first storage address in addition to storing it at the second storage address, the de-duplication module 174 deletes 414 the data block 402 from the first storage address and additionally adds 416 an entry to a routing table establishing a relationship between the first storage address and the unique identifier of the data block that was just deleted from the first storage address. As above, the established relationship simply indicates that the data block deleted from the first storage address is equivalent to the unique identifier, and the unique identifier in turn points to a single instance of the data block at the second storage address. The routing table may be similar and/or identical to the routing table 300 of FIG. 3 and/or to the routing table discussed with respect to FIG. 2.

On the other hand, if the unique identifier 406 for the data block is not currently in the database, the data block 402 is left 418 stored at the first storage address and the unique identifier 406 is added to the database 410 of unique identifiers. In addition to leaving the data block at the first storage address and adding the unique identifier to the database of identifiers, the de-duplication module adds 416 an entry to the routing table establishing a relationship between the first storage address and the unique identifier.

Figure 5:
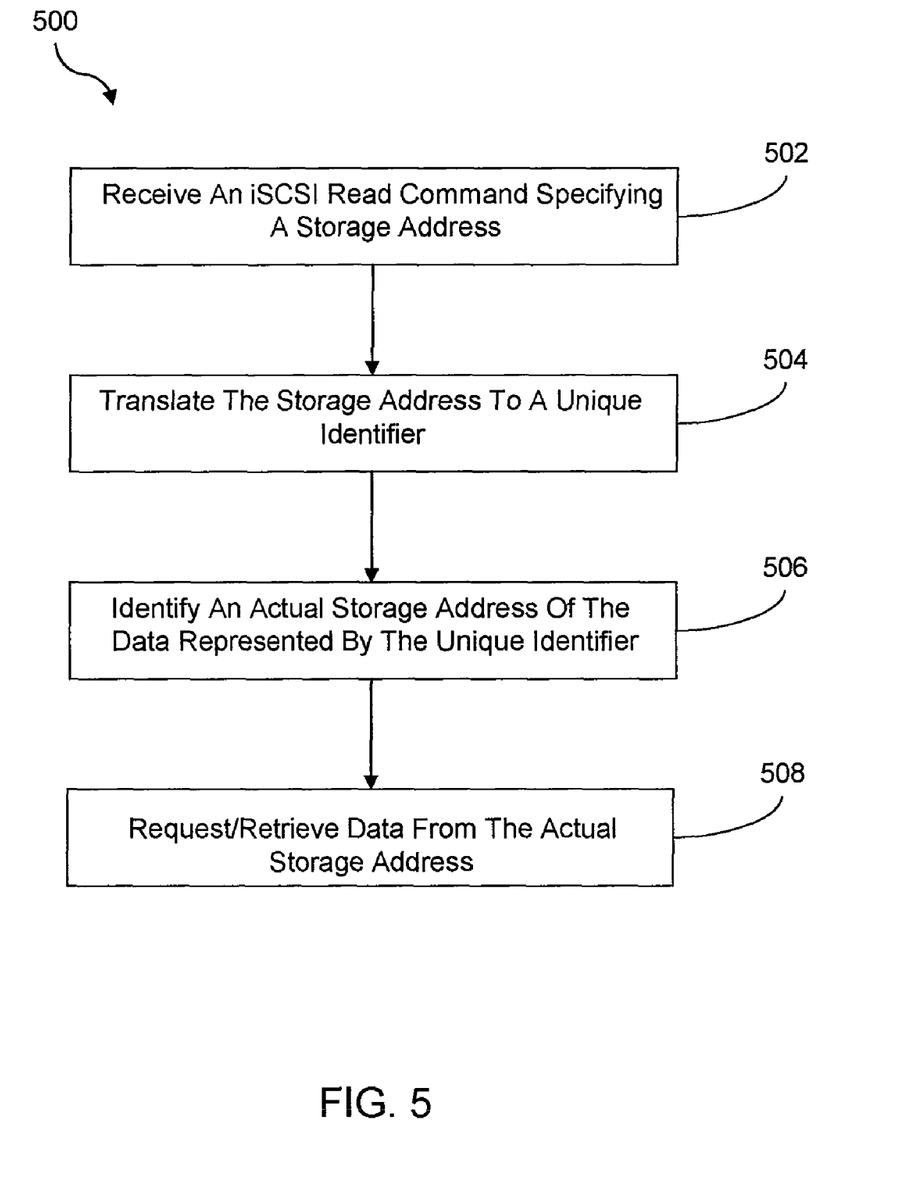
FIG. 5 illustrates an example method for re-routing iSCSI read commands requesting de-duplicated data blocks.

With additional reference to FIG. 5, a method 500 for retrieving data in a de-duplicated iSCSI environment is illustrated. The method 500 can be implemented in conjunction with iSCSI de-duplication implemented in-band at the source, in-band at the target, or out-of-band at the target. The method 500 begins by receiving 502 an iSCSI read command that specifies a starting storage address from which to read one or more data blocks. At step 504, the iSCSI driver 107/108, storage virtualization layer 142, or de-duplication module 174 translates 504 the storage address to a corresponding unique identifier (e.g., the unique identifier corresponds to the data block previously requested to be written to the specified storage address). The storage address can be translated 504 to a corresponding unique identifier using a routing table or hash lookup table, as mentioned above.

The method 500 proceeds by using the unique identifier to identify 506 an actual storage address of the data block represented by the unique identifier. Similar to step 504, step 506 may be accomplished with reference to a routing table or address lookup table. Alternately or additionally, a unique identifier address translation function can be implemented to identify an actual storage address of the data block from the unique identifier. In any event, once the actual storage address of the data block has been identified, it can be requested/retrieved 508 from the actual storage address.

One skilled in the art of iSCSI will appreciate that SCSI write and read commands typically specify a starting storage address and the number of contiguous data blocks that will be written to or read from storage beginning at the starting storage address. In this case, the methods described herein can be applied to each of the data blocks even though a storage address is not explicitly specified for each data block. For instance, a write command may explicitly specify starting storage address 1 for storing multiple data blocks beginning at storage address 1. In this case, the write command implicitly specifies storage address 2 for the second data block, storage address 3 for the third data block, storage address 4 for the fourth data block, and so on.

Furthermore, the methods described herein have been discussed in the context of fixed block size data de-duplication. In particular, data block size for iSCSI is typically 512 bytes per data block. However, data de-duplication can be implemented for other fixed block sizes and/or for variable block sizes. In one embodiment, for example, the iSCSI driver 107/108, storage virtualization layer 142, or de-duplication module 172 may implement the sticky-byte algorithm disclosed in the '398 patent to break data into variable sized pieces based on commonality with other pieces or the likelihood of pieces being found to be in common in the future before assigning probabilistically unique identifiers to the pieces and comparing the probabilistically unique identifiers to the database of probabilistically unique identifiers.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer network that implements the internet small computer systems interface protocol to enable storage access across the computer network, a method for de-duplicating data in-band in the computer network, the method comprising:
receiving a first data block for storage at a first storage address;
assigning a first probabilistically unique identifier to the first data block;
comparing the first probabilistically unique identifier to a plurality of second probabilistically unique identifiers assigned to a plurality of second data blocks previously stored in the network;
if the first probabilistically unique identifier is identical to a second probabilistically unique identifier assigned to a second data block, indicating that the first data block is identical to the second data block stored at a second storage address, adding an entry to a routing table to re-route future read requests specifying the first storage address to the second storage address without storing the first data block at the first storage address, wherein the entry establishes a relationship between the first storage address and the second probabilistically unique identifier and future requests for the first storage address are translated into the second probabilistically unique identifier to re-route the future requests for the first storage address to the second storage address.

2. The method of claim 1, wherein each of the first probabilistically unique identifier and the plurality of second probabilistically unique identifiers comprises a hash valued derived from performing a hash function on the corresponding data block to which the probabilistically unique identifier is assigned.

3. The method of claim 1, wherein the method is implemented by an internet small computer systems interface driver installed on a first source generating data for storage on one or more small computer systems interface storage devices.

4. The method of claim 3, wherein comparing the first probabilistically unique identifier to a plurality of second probabilistically unique identifiers includes comparing the first probabilistically unique identifier to a first database on the first source that includes a first subset of the plurality of second probabilistically unique identifiers and comparing the first probabilistically unique identifier to a second database on a second source that includes a second subset of the plurality of second probabilistically unique identifiers.

5. The method of claim 1, wherein the method is implemented by a storage virtualization layer configured to virtualize some or all of the storage capacity from each of a plurality of small computer systems interface storage devices into a uniform pool.

6. The method of claim 1, further comprising, if the first probabilistically unique identifier is not identical to any one of the second plurality of probabilistically unique identifiers, thereby indicating that the first data block is new and is not identical to any of the second data blocks, storing the first data block in the network and adding the first probabilistically unique identifier to the plurality of second probabilistically unique identifiers.

7. The method of claim 6, wherein if the first probabilistically unique identifier is not identical to any one of the second plurality of probabilistically unique identifiers, the first data block is stored at the first storage address.

8. The method of claim 1, wherein the routing table includes a first information field identifying the identical probabilistically unique identifier, a second information field identifying the second storage address, and a third information field identifying the first storage address as a duplicate storage address where the first data block is not stored since the first data block is identical to the second data block.

9. The method of claim 1, further comprising, receiving a read request specifying the first storage address and re-routing the read request to the second storage address.

10. The method of claim 9, wherein re-routing the read request specifying the first storage address to the second storage address includes:
translating the first storage address to the identical probabilistically unique identifier using the routing table;
identifying the second storage address of the second data block using the identical probabilistically unique identifier; and
requesting or retrieving the second data block from the second storage address.

11. In a computer network that implements the internet small computer systems interface to enable storage access across the computer network, a method for de-duplicating data in-band in a computer network, the method comprising:
receiving a first data block for storage and a small computer systems interface write command specifying a first storage address in the network for storing the first data block;
determining that the first data block is a duplicate of a second data block stored at a second storage address in the network;
establishing a relationship between the first storage address and the second storage address in a routing table; and
storing an entry to the routing table to re-route requests to the first storage address to the second storage address based on the relationship without storing the first data block at the first storage address, wherein, upon receiving a small computer systems interface read command that specifies the first storage address, the routing table redirects the read command to the second data block at the second storage address, wherein future requests for the first storage block are translated into requests for the second storage block to re-route the future requests for the first storage block to the second storage block.

12. The method of claim 11, wherein the method is implemented by one or more of:
at least one internet small computer system interface driver on at least one corresponding source that generates data for storage in the network; and
a storage virtualization layer configured to virtualize some or all of the storage capacity from each of a plurality of small computer systems interface storage devices into a uniform pool.

13. The method of claim 12, wherein if the method is implemented by a storage virtualization layer:
the plurality of small computer systems interface storage devices includes at least one solid state storage device; and
the storage virtualization layer maintains, on the solid state storage device, a database of hash values assigned to previously stored data blocks for identifying duplicate data blocks.

14. The method of claim 11, wherein determining that the first data block is a duplicate of a second data block includes comparing a hash value of the first data block to a plurality of hash values that includes a hash value of the second data block, and wherein the hash value of the first data block is identical to the hash value of the second data block.

15. The method of claim 14, wherein the pointer or reference comprises the hash value of the identical block, and wherein storing a pointer or reference without storing the first data block includes recording the first storage address in a routing table along with the hash value of the identical data block, the routing table indicating the equivalence of the data block not written to the first storage address and the data block pointed to by the hash value.

16. In a computer network that implements the internet small computer systems interface protocol to enable storage access across the network, a method for de-duplicating data out-of-band in a computer network, the method comprising:
storing a first data block at a first storage address in the network and a second data block at a second storage address in the network;
determining that the second data block is identical to the first data block;
deleting the second data block from the second storage address; and
adding an entry to a routing table to re-route future small computer systems interface read commands specifying the second storage address to the first storage address, wherein the entry establishes a relationship between the second storage address and a unique identifier and future requests for the second storage address are translated into the unique identifier to re-route the future requests for the first storage address to the first storage address.

17. The method of claim 16, wherein determining that the second data block is identical to the first data block includes comparing a hash value of the second data block to a plurality of hash values that includes a hash value of the first data block, and wherein the hash value of the second data block is identical to the hash value of the first data block.

18. The method of claim 17, wherein adding an entry to a routing table includes recording the second storage address in the routing table along with the hash value of the identical data block, the hash value of the identical data block pointing to the first data block at the first storage address.

19. The method of claim 18, further comprising:
receiving a small computer system interface read command specifying the second storage address;
using the routing table to identify the hash value corresponding to the second data block deleted from the second storage address;
using the hash value to identify the first storage address of the identical data block; and
retrieving the identical data block from the first storage address.

20. The method of claim 16, wherein the method is implemented within a single small computer systems interface storage device or across a plurality of small computer systems interface storage devices.

* * * * *